United States Patent [19]

Kobayashi et al.

[11] Patent Number: 4,845,436
[45] Date of Patent: Jul. 4, 1989

[54] FREQUENCY SYNTHESIZER SUITED FOR USE IN A TIME DIVISION MULTIPLEXING SYSTEM

[75] Inventors: Hirokazu Kobayashi, Gyoda; Yukihiko Miyamoto, Tama; Masaoki Takai, Tokyo; Syuichi Fujisawa, Tokyo; Hiroshi Miyazawa, Tokyo, all of Japan

[73] Assignees: Trio Kabushiki Kaisha; Nippon Hoso Kyokai, both of Tokyo, Japan

[21] Appl. No.: 178,598

[22] Filed: Apr. 7, 1988

Related U.S. Application Data

[62] Division of Ser. No. 868,037, May 29, 1986.

[30] Foreign Application Priority Data

May 29, 1985 [JP] Japan ............................... 60-114355
May 29, 1985 [JP] Japan ............................... 60-114356

[51] Int. Cl.⁴ ......................... H03B 19/00; H04J 1/02
[52] U.S. Cl. ....................................... 328/14; 328/15; 370/70
[58] Field of Search ........................ 328/14, 15, 21, 24; 455/313, 314; 370/70

[56] References Cited

U.S. PATENT DOCUMENTS

| | | | |
|---|---|---|---|
| 4,100,498 | 7/1978 | Alsup et al. | 328/14 |
| 4,159,526 | 6/1979 | Mosley, Jr. et al. | 328/14 |
| 4,297,641 | 10/1981 | Sterzer | 328/15 |
| 4,437,066 | 3/1984 | Gordon | 328/15 |
| 4,486,846 | 12/1984 | McCallister et al. | 328/14 |

OTHER PUBLICATIONS

"PCM Communication Technology", by N. Kaneko, SANPO Publication Inc., FIG. 5.24.

*Primary Examiner*—John S. Heyman
*Assistant Examiner*—Richard Roseen
*Attorney, Agent, or Firm*—Gerald J. Ferguson, Jr.

[57] ABSTRACT

A frequency synthesizer includes a 1/N divider for generating an address clock signal the frequency of which is 1/N times the frequency of an input signal, a memory for storing samples in a unit sine and cosine wave which is read out in response to the address clock signal to produce a frequency deviation signal, and a quadrant modulator responsive to both of the input signal and frequency deviation signal for producing an output signal the frequency of which is the difference between the input signal and frequency deviation signal. The frequency of the frequency deviation signal is varied by digitally changing N to modify the frequency of the output signal while maintaining the continuousness of the output signal phase.

5 Claims, 6 Drawing Sheets

FREQUENCY SYNTHESIZER SUITED FOR USE IN A TIME DIVISION MULTIPLEXING SYSTEM

This is a divisional application of Ser. No. 868,037, filed May 29, 1986.

BACKGROUND OF THE INVENTION

1. Field of the Invention

The present invention relates to a frequency synthesizer suited in time division multiplexing system, particularly in a time-division-multiplexed signal demultiplexing system for demultiplexing a multiplex signal, obtained by time division multiplexing of plural digital or analog information signals of mutually different sampling or clock frequencies, into original information signals of the state before multiplexing.

2. Related Art

There is a time-division-multiplexed signal demultiplexing system which is capable of facilitating the write-in and read-out control of a memory unit for varying the frequency of clock signal for demultiplexing the time division multiplexed signal, obtained in the above-mentioned system, into the original signals, and enabling a stable demultiplexing operation against a drift in the clock frequency of the signal caused by temperature or Doppler shift of the satellite prior to multiplexing, a drift in the clock frequency of the time division multiplexed signal and a drift of a clock frequency control circuit in the demultiplexing decoder.

In the above-described time division multiplexed transmission system, if dummy data are generated at an interval of x frames after multiplexing, the real information corresponds to (x−1) frames between said dummy data. Therefore, in the regeneration of the original signals from the time division multiplexed signal, it is necessary to maintain the frequency of the read-out clock signal low than 1/N of the frequency of transmission clock signal after time division multiplexing, in order to extend, in signal read-out, the real information of (x−1) frames to the period of x frames of the time division multiplexed signal.

In the system, the write-in frame and read-out frame of a buffer memory are inspected and the frequency of read-out clock signal is controlled according to the difference there-between.

Upon each detection of a dummy flag bit, the write-in operation is temporarily interrupted for a period of $\beta$ frames. Then the frequency of read-out clock signal is reduced, and, when the difference between the write-in frame and the read-out frame returns to $\beta$ frames or larger, the frequency of the read-out clock signal is returned to the original value $F_W/N$ thereby regenerating the original data before the time division multiplexing.

Assuming that the minimum period between dummy data is $T_{min}$, there stands a relation $x \times T_{min} > T$ wherein T is a frequency control period in which the frequency of the read-out clock signal is controlled. Thus the sift in the clock frequency of the information signal after demultiplexing can be made smaller if the change in the read-out clock frequency during the frequency control is smaller.

In the above mentioned system, the read-out clock signal is generated by a frequency synthesizer. When the frequency of read-out clock signal is reduced as the output signal is the frequency synthesizer upon the dummy data detection, the frequency synthesizer is suitable for obtaining an output signal of which phase is continuous from a state where the phase and frequency of the input signal are retained and of which frequency varies little by little from the frequency of the input signal.

In such case, the quality of the regenerated audio signal is improved when the reading clock signal has continuous phase and shows a slight change in the frequency at a time. It is therefore desirable that the change in the frequency of the reading clock signal is selected small.

It has however been difficult to obtain an output signal having a continuous phase and showing successive slight changes in the order of one-millionth in the frequency with respect to the input frequency, for example with a PLL circuit, because the locking function is not satisfactorily achieved.

SUMMARY OF THE INVENTION

In consideration of such drawbacks, there is proposed a frequency synthesizer according to the present invention, the synthesizer comprising means for receiving a first frequency signal; means for generating an address clock signal the clock frequency of which is 1/N times the frequency of the first frequency signal, N being an integer; means for storing a predetermined number of samples in an unit sine or cosine wave, each sample being read out in response to each clock of the address clock signal to produce a second frequency signal; and a quadrant modulator in response to both of the first frequency signal and second frequency signal for producing a third frequency signal the frequency of which is the difference between the frequencies of the first and second frequency signals.

BRIEF DESCRIPTION OF THE DRAWINGS

FIGS. 5 and 6 are charts showing the timing of write-in into and read-out from the frame memory of the demultiplexer of the present invention;

DETAILED DESCRIPTION OF THE PREFERRED EMBODIMENTS

This invention is related to the frequency synthesizer shown in FIG. 9 and its discussion below in the specification.

Figure 8:
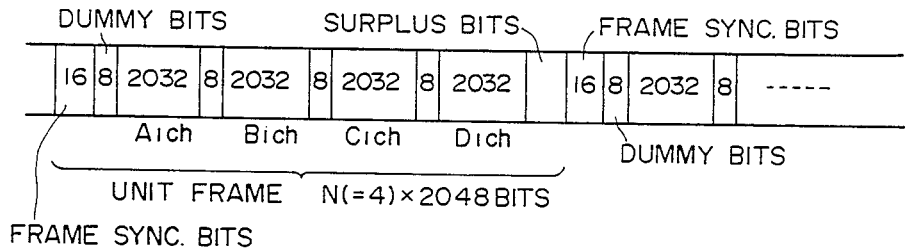
FIG. 8 is a schematic view showing the frame structure of a time division multiplexed signal.

Prior to the description of embodiments, reference is made to FIG. 8 showing a frame structure in case of demodulating an audio subcarrier of a satellite broadcasting into QPSK, and multiplexing, in the above-described process, four channels of thus obtained bit streams of 2,048 Mbit/s. As shown in FIG. 8, a unit frame stream is composed of frame synchronization data of 16 bits; dummy information of 8 bits; an A-channel information signal of 2,032 bits; dummy information of 8 bits; a B-channel information signal of 2,032 bits; dummy information of 8 bits; a C-channel information signal of 2,032 bits; dummy information of 8 bits; a D-channel information signal of 2,032 bits; 16 surplus bits. The dummy information preceding the information signal of each channel includes a dummy flag bit indicating whether the information signal of succeeding channel is dummy data, and said dummy flag bit can be utilized for such discrimination.

Figure 1:
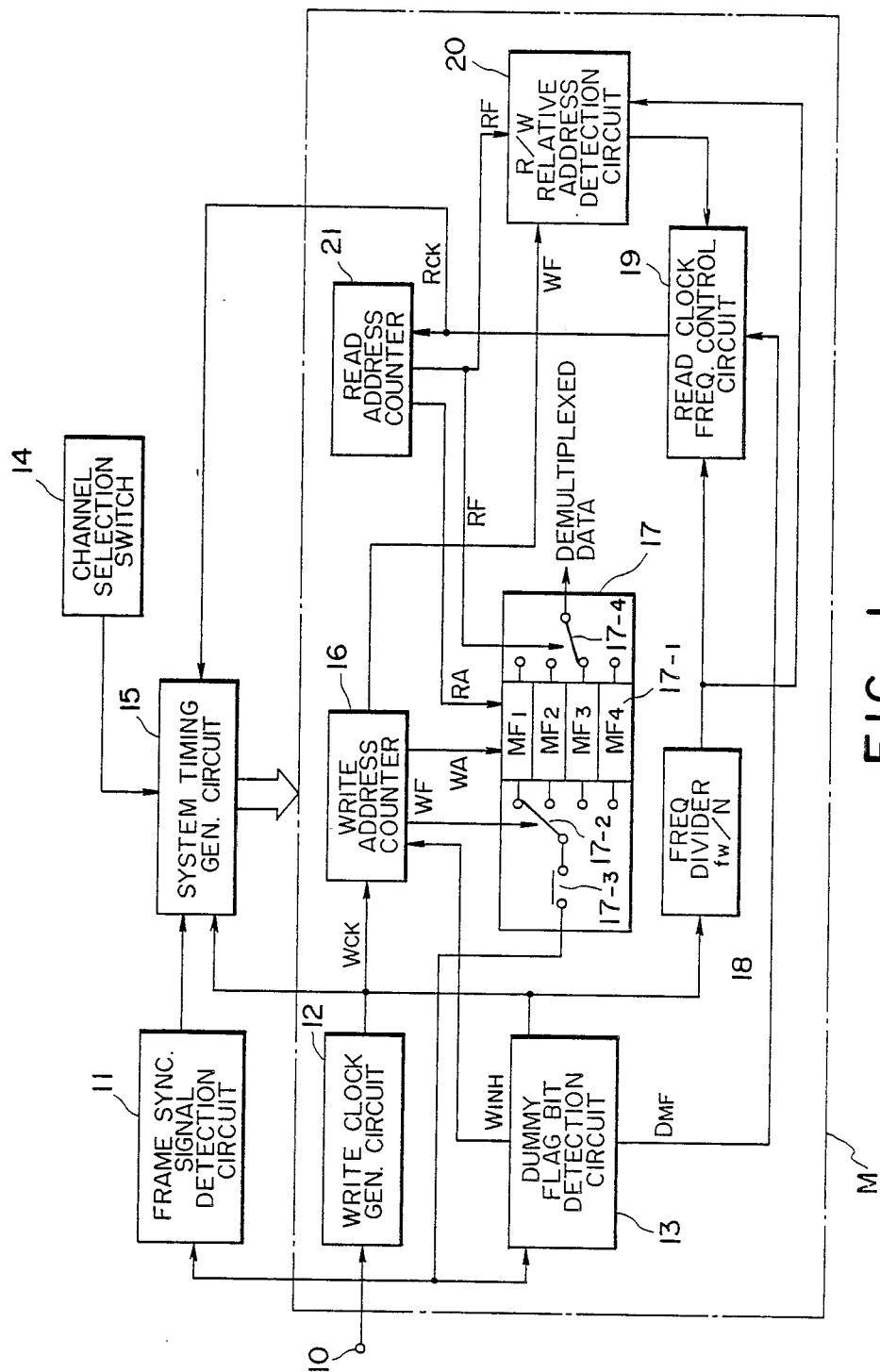
FIG. 1 is a block diagram showing the structure of a demultiplexer of the present invention.

FIG. 1 is a block diagram of an embodiment of the present invention, corresponding to a state $\alpha=0$, $\beta=0$ and $x=1$.

Figure 2:
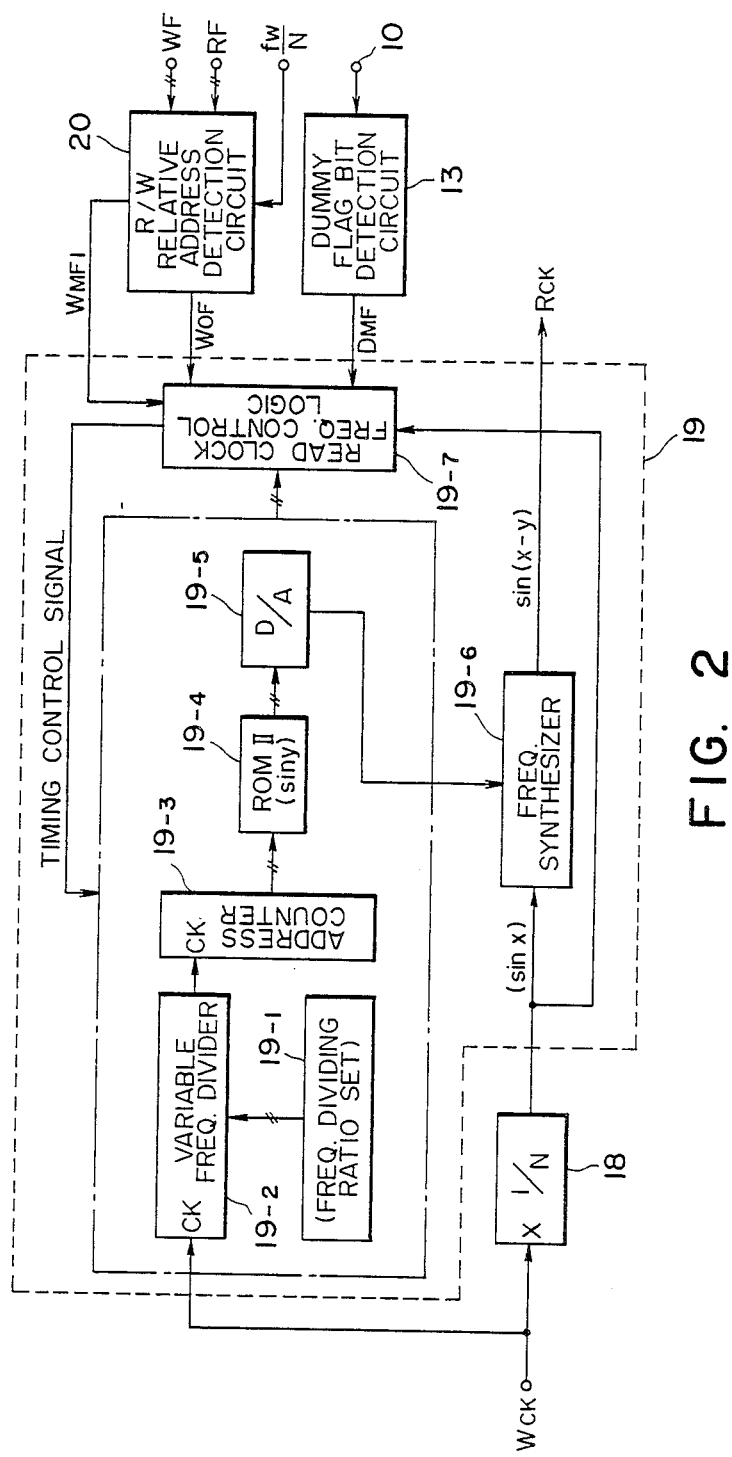
FIG. 2 is a block diagram showing the structure of a read-out clock frequency control circuit to be employed in the demultiplexer of the present invention.
Figures 1, 2, 5A, 5B, 5C, 5D:
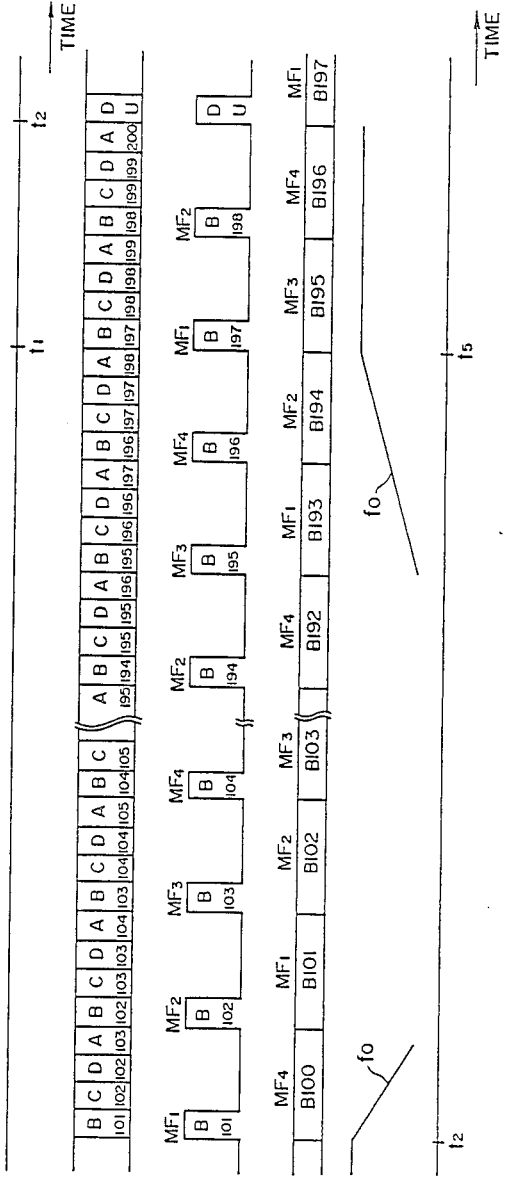

An input terminal 10 receives a time division multiplexed signal, obtained by the aforementioned time division multiplexing system. In the present embodiment it is assumed that a bit stream of $4\times2,048$ Mbit/s shown in FIGS. 5A-1 and 5A-2 is received. It is to be noted that the bit streams shown in FIGS. 5A-1 and 5A-2 are partially overlapping but are in fact continuous in time.

Said bit stream is supplied to a frame synchronization signal detection circuit 11 and a write clock signal regenerating circuit 12, and the former detects the frame synchronization signal while the latter regenerates the write clock signal $W_{CK}$. The bit stream and write clock signal $W_{CK}$ are supplied to a dummy flag bit detecting circuit 13, which is used for detecting a dummy flag bit in the dummy information to identify whether the information signal of the succeeding channel is dummy data, and, upon identification of such dummy data, releases an inhibition signal $W_{INH}$ for inhibiting the counting operation of a write address counter 16 to be explained later.

The frame synchronization signal, the write clock signal $W_{CK}$, an output signal of a channel selection switch 14 for selecting the channel of reception, and a read clock signal $R_{CK}$ to be explained later are supplied to a system timing generation circuit 15, which generates a timing signal required for decoding operation in a main unit M of the signal demultiplexer or decoder.

In the present embodiment there is provided a memory block 17, which is composed of a buffer frame memory 17-1 consisting of four frame memories $MF_1$-$MF_4$, frame memory selector switches 17-2, 17-4 and an input selector switch 17-3 for supplying the frame memory selector switch 17-2 with information signal of a channel selected by the channel selector switch 14 from the bit stream. Each frame memory has a capacity capable of storing the transmission or sending data of a frame, which is 2,032 bits in the present embodiment.

The writing clock signal $W_{CK}$ is supplied to a writing address counter 16 to generate a writing address signal WA and a frame memory number signal WF corresponding to the writing frame memory number. Said writing address signal WA is supplied to the memory block 17 to designate a writing address, while the frame memory number signal WF is used for controlling the selector switch 17-2 to select a writing frame. On the other hand, the inhibition signal $W_{INH}$ is also supplied to the writing address counter 16 to stop the increment of the address number, thereby inhibiting the writing operation of a frame memory in the memory block 17.

The writing clock signal $W_{CK}$ is supplied also to a frequency dividing circuit 18 to obtain a frequency f1 which is equal to 1/N of the transmission clock frequency after time division multiplexing. The output signal of said frequency dividing circuit 18 is supplied to a reading clock frequency control circuit 19 to generate a reading clock signal $R_{CK}$ of a frequency f0. Upon reception of a dummy flag detection output signal $D_{MF}$ from the dummy flag bit detection circuit 13 in response to the detection of a dummy flag and also upon reception of the output signal of the frequency dividing circuit 18, said reading clock frequency control circuit 19 gradually reduces the frequency f0 of the reading clock signal from f1 to f3 from the start of writing operation into a frame memory, for example the first frame memory MF1, of the memory block 17 after the detection of the dummy flag, and, upon detection of a difference of two frames between the writing address into the first frame memory MF1 and the reading address from said first frame memory MF1, increases said frequency from f3 to f1 in response to the output signal of a read/write relative address detection circuit 20.

The reading clock signal $R_{CK}$ is supplied to a reading address counter 21, which generates a reading address signal RA and a frame memory number signal RF corresponding to the reading frame memory number, and the former is supplied to the memory block 17 for designating a reading address, while the latter is used for controlling the selector switch 17-4 to select a reading frame.

The transmission clock signal after multiplexing, or the writing clock signal $W_{CK}$ and the frame synchronization signal are detected from the bit stream supplied to the input terminal 10, as shown in FIGS. 5A-1 and 5A-2, for achieving frame synchronization.

Also the timing signal from the system timing generation circuit 15 controls the selector switches 17-2, 17-4 in such a manner as to have a delay of one frame between the writing frame memory and the reading frame memory at the start of power supply or at the switching of the channel selected by the channel selector switch 14, or, to have an offset of two frames so that there exists a frame between the writing frame memory and the reading frame memory. It is assumed that the channel selector switch 14 selects the channel B, and that the sampling or clock frequency of said channel B before multiplexing is lower than that of other channels.

After the channel synchronization is achieved, the information signal of said channel B is extracted from the bit stream through the input selector switch 17-3 in response to the timing signal from the system timing generation circuit 15, and the information signal of a channel is sequentially supplied, by the selector switch 17-2 shifted by the frame memory number signal WF, to a frame memory, and stored in succession in the frame memories MF1, MF2, ..., MF4, MF1, ... in synchronization with the writing clock signal $W_{CK}$. This state is schematically shown in FIGS. 5B-1 and 5B-2 which are partially overlapping, and which illustrate a case of containing dummy data at every 100 frames.

On the other hand, the writing clock signal $W_{CK}$ is subjected to a frequency division of 1/N in the frequency dividing circuit 18, and the reading clock frequency control circuit 19 releases the reading clock signal $R_{CK}$ of a frequency f1 (=fw/4). In response to the frame memory number RF, the frame selector switch 17-4 is shifted with a delay of two frames from the writing frame memory and in synchronization with the reading clock signal $R_{CK}$, whereby the information signal of the channel B is sequentially read from the frame memories MF1, ..., MF4, ... in synchronization with the reading clock signal $R_{CK}$ of a frequency equal to ¼ of the writing frequency. This state is schematically shown in FIG. 5C-1, and a delay of two frames of the reading frame memory from the writing frame memory will be apparent from the comparison with FIG. 5B-1.

Figure 4:
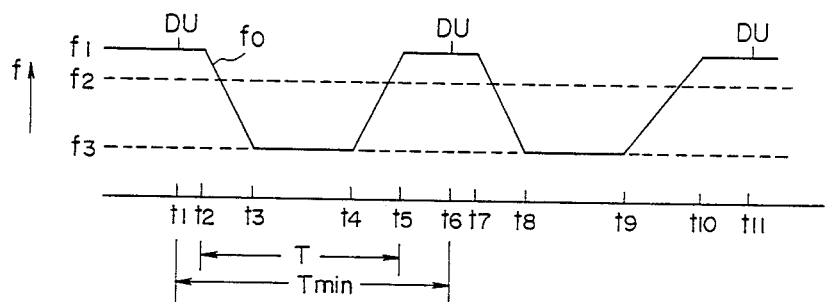
FIG. 4 is a chart showing the deviation in frequency of the read-out clock signal in the demultiplexer of the present invention.

In the 100th frame of the channel B there is inserted is a dummy data DU. Consequently, in the dummy information preceding said 100th frame there is set a dummy flag, indicating that the succeeding information signal is dummy data, which is detected in the dummy flag bit detection circuit 13 to release the inhibition signal $W_{INH}$. In FIGS. 4 and 5, the dummy flag bit is detected at t1, t6 and t11. In response to said inhibition signal $W_{INH}$, the writing operation of the information signal of a frame, which is dummy data in this case, is inhibited, but the reading operation is conducted in synchronization with the reading clock signal $R_{CK}$ of the same frequency f1. In this manner the clock uncontrolled state is maintained in this period. As the result the distance between the reading frame memory and the writing frame memory becomes smaller, and the reading frame is positioned next to the writing frame when the writing operation is restarted. Even in this state the writing operation is conducted in succession into the frame memories MF1, ..., MF4, ... After the detection of the dummy flag bit, the first writing operation into the first frame memory MF1 is detected (t2, t7) by the reading clock frequency control circuit 19, and the frequency f0 of the reading clock signal $R_{CK}$ is gradually lowered from f1 to f3, starting from the time t2 or t7, and is temporarily retained at f3. In FIG. 4, the frequency of the reading clock signal $R_{CK}$ coincides with the frequency f3 at the timings t3 and t8.

On the other hand, during a period in which the frequency f0 of the reading clock signal $R_{CK}$ is reduced from f1 to f3 and retained at f3, the output frequency (fw/N) of the frequency dividing circuit 18 is counted after the first frame memory MF1 becomes the writing frame until said first frame memory MF1 becomes the reading frame memory, and the read/write relative address detection circuit 20 discriminates whether the obtained count reaches a value corresponding to two frame memories When such state is reached (time t4, t9), the frequency of the reading clock signal $R_{CK}$ is gradually returned from f3 to f1. After the frequency f0 of the reading clock signal $R_{CK}$ reaches f1 (time t5, t10), it is retained at f1 until the detection of succeeding dummy flag bit. FIGS. 5D-1 and 5D-2 illustrate a part of the state shown in FIG. 4, parallel to FIGS. 5C-1 and 5C-2.

Figure 6:
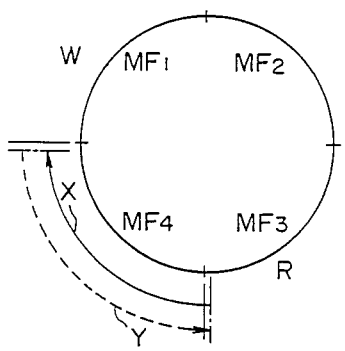

In the following the above-described function is explained with a fixed writing frame memory. As shown in FIG. 6, the writing frame memory W and the reading frame memory R have an initial offset of two frames, but the writing operation is interrupted for a period of one frame upon detection of a dummy flag bit. During this period the reading clock signal is in the clock uncontrolled state, and the reading frame memory alone proceeds relative to the reading frame memory as indicated by X, so that the writing and reading frame memories have an offset of one frame when the writing operation is re-started. Said offset of one frame is retained until the information signal is written into a selected frame memory, which is the first frame memory MF1 in the foregoing example. After the start of said writing the frequency f0 of the reading clock signal $R_{CK}$ is gradually reduced so that the offset between the writing and reading frame memories increases to two frames as indicated by Y. Said frequency f0 of the reading clock signal $R_{CK}$ returns to the original value when said offset reaches two frames. However, in practice, the distance between the writing and reading frame memories becomes larger corresponding to the periods t4–t5 and t9–t10 shown in FIG. 4, so that the offset between said memories is slightly larger than one frame.

The frequency f0 of the reading clock signal $R_{CK}$ is gradually reduced or increased in order to avoid rapid frequency change, thereby preventing deterioration in the sound quality, particularly deterioration caused by the drift in the sampling frequency, in the demodulation of an analog audio signal, for example in a PCM audio signal in satellite broadcasting. Consequently the frequency control of the reading clock signal should preferably be conducted gradually over a period as long as possible within the period of dummy data. For this purpose the lower limit frequency f3 of the reading clock signal $R_{CK}$ should be selected small.

In FIG. 2, f2 represents the frequency of the original transmission clock signal prior to the time division multiplexing at the transmission side.

Figure 3:
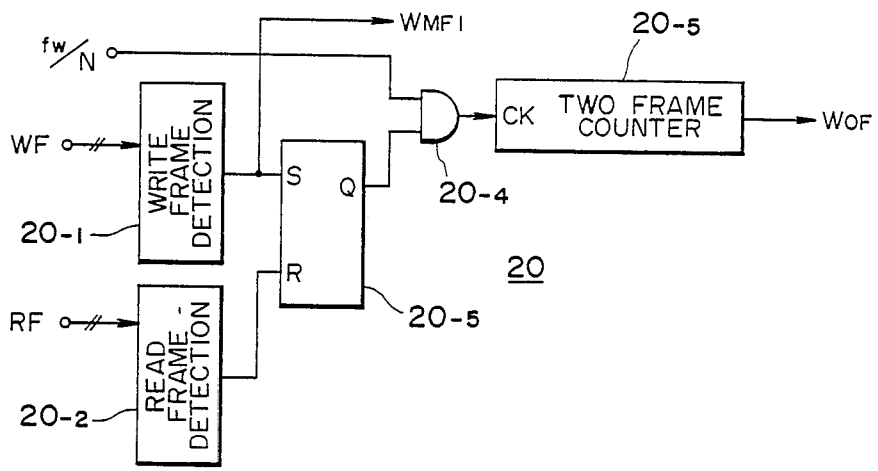
FIG. 3 is a circuit diagram showing the structure of a read/write relative address detection circuit to be employed in the demultiplexer of the present invention.

Now reference is made to FIGS. 2 and 3 for explaining examples of the reading clock frequency control circuit 19 and the read-write relative address detection circuit 20.

The reading clock frequency control circuit 19 divides the frequency of the writing clock signal $W_{CK}$, in a variable frequency divider 19-2, with a frequency dividing ratio stored in a ROM 19-1, and a writing clock signal of thus divided frequency is counted by an address counter 19-3 for designating the reading address of a ROM 19-4. Said ROM 19-4 stores data of a cycle of a sinusoidal wave signal, and said data is read according to the addressing by the address counter 19-3 and is converted into an analog signal by a D/A converter 19-5. Consequently the D/A converter 19-5 releases a sinusoidal signal, of which frequency depends on the frequency dividing ratio in the variable frequency divider 19-2, or the frequency dividing ratio stored in the ROM 19-1.

The outputs of the frequency dividing circuit 18 and of the D/A converter 19-5 are subjected to a frequency synthesis in a frequency synthesizer 19-6 in such a manner as to obtain an output sin(x−y) from inputs sin x and sin y. Consequently the output frequency from the frequency synthesizer 19-6 ca be changed little by little according to the frequency dividing ratio stored in the ROM 19-1.

On the other hand, upon reception of a detection output signal $D_{MF}$ from the dummy flag bit detection circuit 13 and of a signal $W_{MF1}$ from the read-write relative address detection circuit 20 indicating the start of writing operation into the first frame memory MF1, a reading clock frequency controlling logic circuit 19-7 initiates the addressing of the ROM 19-1 thereby conducting variable frequency dividing. Also said circuit retains the addressing of the ROM 19-1 when the output frequency of the frequency synthesizer 19-6 reaches f3. Consequently the frequency f0 of the reading clock signal $R_{CK}$ is reduced little by little from f1 to f3, and is then retained at f3. Also in response to a carry output signal $W_{OF}$ from the read/write relative address detection circuit 20, said circuit re-starts the addressing of the ROM 19-1, thereby gradually increasing the output frequency from f3 to f1.

In response to the frame memory number signal WF from the writing address counter 16, the read/write relative address detection circuit 20 discriminates by means of a writing frame detector 20-1, the start of writing operation into the first frame memory MF1, and releases a detection output signal to set a flip-flop 20-3. Also a reading frame detector 20-2 receives the frame memory number signal RF from the reading address counter 21 to discriminate the start of reading operation from the first frame memory MF1, and a corresponding output signal is used to set a flip-flop 20-3. The output Q of said flip-flop 20-3 opens an AND gate 20-4, whereby the output signal of the frequency dividing circuit 18 is supplied and counted in a two-frame counter 20-5 to obtain the carry output signal $W_{OF}$.

Consequently the presence of offset of two frames is repeatedly checked in a period from t2 to t4 shown in FIG. 4, or from the start of writing operation to the start of reading operation of the first frame memory MF1, and the carry output signal $W_{OF}$ is released in the presence of said offset of two frames. The frequency of the reading clock signal $R_{CK}$ is increased from the generation of said carry output signal $W_{OF}$.

If the foregoing embodiment the frequency f0 of the reading clock signal $R_{CK}$ is controlled in a trapezoidal form, but a stepwise or triangular control is also possible.

Also in the foregoing embodiment there is described a case in which the memory block 17 is provided with four frame memories and there stands a condition Tmin > T wherein the control of the frequency f0 of the reading clock signal $R_{CK}$ is completed within a period between detections of succeeding two dummy flag bits, but in such case the memory block 17 requires three frame memories at minimum.

It is also possible, through an increase in the number of frame memories, to achieve a condition x·Tmin > T, wherein x is an integer equal to or larger than 2, whereby the period T of frequency control extends over plural intervals of dummy flag bit detections. As an example, with six frame memories, the frequency of the reading clock signal $R_{CK}$ can be controlled over a period T satisfying a condition 4 × Tmin > T. In this manner the change in frequency of the reading clock signal can be further reduced FIG. 7B schematically illustrates a case of 4 × Tmin > T > 3 × Tmin.

Figure 7A:
FIG. 7 is a chart showing another example of the deviation in the read-out clock signal frequency of the demultiplexer according to the present invention.
Figure 7B:
Figure 7C:

FIG. 7A shows the timing of detection of dummy flag bits, and FIG. 7C illustrates the case of the foregoing description for the purpose of comparison.

Figure 7D:

Also in this case with six frame memories, it is also possible to reduce the range of variation of the frequency of the reading clock signal, as shown in FIG. 7D, if the rate of variation of said frequency is selected equal to the case of FIG. 7C.

As explained in the foregoing, the present invention enables a stable write/reading operation, thereby providing continuous transmission data before time division multiplexing, by interrupting the writing operation into the frame buffer memory during the reception of the dummy data in response to the detection of a dummy flag bit, then reducing the frequency of the reading clock signal, and returning the frequency of said reading clock signal when the decrease in the difference of the writing and reading addresses of the frame buffer memories, caused during the reception of the dummy data, is recovered. It is also possible, through the increase in the capacity of the frame buffer memories, to reduce the rate of decrease or increase of the frequency of said reading clock frequency or to reduce the range of variation of said frequency, thereby reducing the deterioration in the regenerated audio quality, caused by deviation in the sampling frequency. Also there is ensured a stable operation against the drift in the transmission clock frequency or the drift in the frequency control circuit, since the frequency of the reading clock signal is controlled according to the amount of delay from the data writing to the data reading.

Figure 9:
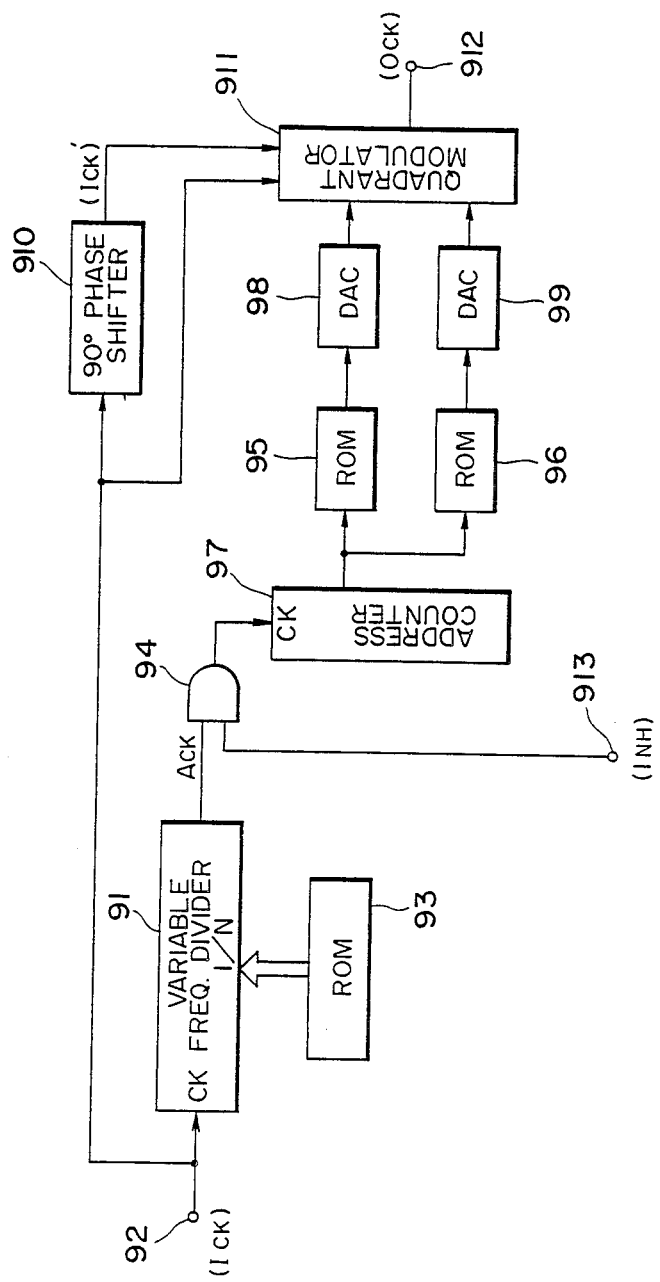
FIG. 9 is a circuit diagram of a frequency synthesizer particularly suitable for use in the demultiplexer of the present invention.

FIG. 9 shows an example of a frequency synthesizer adapted for use in a decoder for separating a signal obtained by time division multiplexing of information signals of plural channels of mutually different transmission clock frequencies, and said frequency synthesizer is suitable for obtaining an output signal of which phase is continuous from a state where the phase and frequency of the input signal are retained and of which frequency varies little by little from the frequency of the input signal.

In such case, the quality of the regenerated audio signal is improved when the reading clock signal has continuous phase and shows a slight change in the frequency at a time. It is therefore desirable that the change in the frequency of the reading clock signal is selected small.

It has however been difficult to obtain an output signal having a continuous phase and showing successive slight changes in the order of one-millionth in the frequency with respect to the input frequency, for example with a PLL circuit, because the locking function is not satisfactorily achieved.

In consideration of such drawbacks, there is proposed a frequency synthesizer shown in FIG. 9, which is capable of providing an output signal which is continuous in phase and shows successive slight changes in the frequency with respect to the input frequency.

In addition, the frequency synthesizer shown in FIG. 9 allows digital control.

The frequency synthesizer shown in FIG. 9 is provided with first memory means storing frequency dividing ratios for the input signal, and second and third memory means respectively storing divided data of a cycle of sine wave and cosine wave. An input signal is subjected to frequency division in a variable frequency divider with a frequency dividing ratio read from the first memory means, and the frequency obtained by said frequency division is counted by an address counter. According to the obtained count, data stored in the second and third memory means are read and converted into analog values. On the other hand, the input signal is subjected to a phase shift of 90° by a 90° phase shifter.

The input signal and the output signal of the phase shifter are subjected to an orthogonal modulation in an orthogonal modulator with the signal read from the second and third memory means and subjected to analog conversion, thereby obtaining a frequency-synthesized output signal.

In the above-described structure, a sine wave and a cosine wave are obtained by analog conversion of the data read from said second and third memory means. The frequency of said sine and cosine waves can be varied by the frequency dividing ratio stored in the first memory means, if the memory capacity of the second and third memory means, or the number of dividing points in a cycle of said wave, is fixed. Thus the input signal and the output signal of the phase shifter are subjected to the orthogonal modulation by the sine and cosine waves with thus modified frequency.

As the result there can be obtained an output signal which is continuous in phase and of which frequency is varied little by little in response to the change in the frequency dividing ratio stored in the first memory means.

In FIG. 9, a variable frequency divider 91 generates an address clock signal $A_{CK}$ by dividing the frequency of a clock signal $I_{CK}$ supplied to an input terminal 92, or the writing clock signal $W_{CK}$ in the foregoing example of decoder for the multiplexed data. The frequency dividing ratios N for the variable frequency divider 91 are stored in advance in a ROM 93, and are read and supplied to said variable frequency divider 91 in response to the output signal of an unrepresented address counter for counting a determined clock signal.

The address clock signal $A_{CK}$ thus generated is supplied through an AND gate 94, and counted in an address counter 97. Said AND gate 94 is controlled by a control signal $I_{NH}$ supplied thereto through an input terminal 913.

ROM's 95, 96 respectively store data representing values at dividing points of a cycle of a unit sine wave and a unit cosine wave, wherein the term "unit" means that the amplitude is equal to unity.

The ROM's 95, 96 are addressed by the output signal of the address counter 97 which counts the address clock signal $A_{CK}$, and the data read from said ROM's 95, 96 in response to said addressing are respectively converted into analog signals by D/A converters 98, 99.

The clock signal $I_{CK}$ supplied to the input terminal 92 is subjected to a phase shift of 90° by a phase shifter 910. Said clock signal $I_{CK}$, a clock signal $I_{CK'}$ after the phase shift of 90° in the phase shifter 910, the output analog signal from the D/A converter 98 and the output analog signal from the D/A converter 99 are supplied to an orthogonal modulator 911 to effect a signal synthesis, in which the clock signal $I_{CK}$ and the phase-shifted clock signal $I_{CK'}$ are used as carrier and the output signals from the D/A converters 98, 99 are used for amplitude modulation, and the obtained signal is released from an output terminal 912.

If the clock signal $I_{CK}$ has a form of sin x with a frequency $f_{ICK}$, the phase shifter 910 provides an output signal cos x, wherein $x=2\pi f_{ICK}t$. The clock signal $I_{CK}$ is subjected to a frequency division of 1/N in the variable frequency divider 91, and is counted by the address counter 97 when the control signal $I_{NH}$ is at the high level state. Thus the data of the ROM's 95, 96 are read according to the addressing by the count of the address counter 97, and are converted into analog signals by the D/A converters 98, 99. The analog signals thus converted are a unit sine wave and a unit cosine wave, of which frequency is determined by the capacities of the ROM's 95, 96 and the frequency $f_{ACK}$ of the address clock signal $A_{CK}$, and is equal to $f_{ACK}/M$ wherein M is said capacity. It is therefore possible to control the frequency of the unit sine and cosine waves released from the D/A converters 98, 99 by a change in the frequency $f_{ACK}$ the address clock signal $A_{CK}$. Said frequency $f_{ACK}$ can be changed by varying the frequency dividing ratio N of the variable frequency divider 91, through the selection of the frequency dividing ratio data to be stored in the ROM 93.

The unit sine and cosine waves respectively released by the D/A converters 98, 99 can be represented by sin y and cos y, wherein $y=2\pi(f_{ACK}/M)t$. Consequently the clock signal $O_{ck}$ released from the output terminal 912 after amplitude modulation in the orthogonal modulator 911 can be represented by sin(x−y) or cos(x−y). On the other hand, the unit sine wave sin y can be varied to sin(y+$\theta_1$), and the unit cosine wave cos y can be varied to cos(y+$\theta_1$) by a change of the frequency of the address clock signal $A_{CK}$ to $[f_{ACK}+\Delta f_{ACK}]$ through a regulation of the frequency dividing ratio supplied to the variable frequency divider 91, wherein $(y+\theta_1)=\{2\pi[(f_{ACK}+\Delta f_{ACK})/M]t\}$. Consequently the clock signal $O_{ck}$ becomes equal to sin[x−(y+$\theta_1$)] or cos[x(y+$\theta_1$)], and in the foregoing example of multiplexed signal decoder, said clock signal $O_{ck}$ is used as the reading clock signal $R_{CK}$.

Thus it is rendered possible to obtain the output clock signal $O_{CK}$ varying by a small amount in response to the input clock signal $I_{CK}$, by selecting, in the data of frequency dividing ratio stored in the ROM 93, a small change between neighboring addresses.

As explained in the foregoing, the use of the orthogonal modulator 911 allows to obtain an output clock signal $O_{CK}$ which is continuous in phase and is capable of varying the frequency little by little, and which is continuous in phase even when the input signal $I_{CK}$ is switched from the state of clock signal to the state of frequency synthesis.

As explained in the foregoing, the frequency synthesizer shown in FIG. 9 allows to obtain an output signal continuous in phase, through the use of an orthogonal modulator for frequency synthesis.

Also since the modulation signal frequency supplied to the orthogonal modulator is obtained from the transmission clock frequency, the obtained output signal is synchronized with the transmission clock signal and does not require adjustment for synchronization.

Besides the modulation signal frequency supplied to the orthogonal modulator can be varied from DC since it is controlled by the frequency of the address clock signal. Also it is possible to obtain an output signal with a frequency variable in small portions since ROM's are employed for determining the frequency dividing ratio N for deciding the frequency of said address clock signal. Furthermore there is obtained a large freedom for varying the frequency of the output signal.

What is claimed is:
1. A frequency synthesizer comprising:
first memory means storing frequency dividing ratios;
a variable frequency divider for dividing the frequency of an input signal with a frequency dividing ratio read from said first memory means to output a frequency-divided input signal;
second memory means storing data at different sample points of a cycle of a unit sine wave;
third memory means storing data at different sample points of a cycle of a unit cosine wave;
an address counter for counting the frequency-divided input signal from the variable frequency divider thereby providing reading addresses of the second and third memory to sequentially read out the data stored in the second and third memory means;
first and second converting means for respectively converting the data read from said second and third memory means respectively into a first and second analog signals;
a phase shifter for shifting the phase of the input signal by 90°; and an orthogonal modulator for modulating the input signal and the output of said phase shifter with the first and second analog signals from said first and second converting means.

2. A frequency synthesizer comprising:

means for receiving a first frequency signal;

means for generating an address clock signal the clock frequency of which is 1N times the frequency of the first frequency signal, N being an integer;

means for storing a predetermined number of samples in a unit sine or cosine wave, each sample being read out in response to each clock of the address clock signal to produce a second frequency signal; and a quadrant modulator in response to both of the first frequency signal and second frequency signal for producing a third frequency signal the frequency of which is the difference between the frequencies of the first and second frequency signals.

3. A frequency synthesizer according to claim 2, wherein said address clock signal generating means includes a frequency divider for dividing the frequency of the first frequency signal by 1/N.

4. A frequency synthesizer according to claim 3, wherein said N is variable.

5. A time division multiplexed signal demultiplexing system for regeneration of a plurality of original signals having information coded in a predetermined frame format from a time division multiplexed signal which is obtained by time-division multiplexing information signals of N channels with mutually different sampling or clock frequencies by means of a reference clock signal of a frequency equal to N times of the highest of one of said sampling or clock frequencies or an even higher frequency, and inserting a dummy signal and a dummy flag bit in pairs in the portion where the corresponding information signal is unavailable due to the difference in frequencies among said plurality of original information signals, which comprises a frame buffer memory, a reading means for reading said frame buffer memory to produce said plurality of output signals, a writing clock signal having a writing clock frequency, a reading clock signal having a reading clock frequency, a means for performing a writing operation into said frame buffer memory, a means for detecting a dummy flag bit, a frame buffer memory capable of realizing a delay between a writing frame and a reading frame, and means for controlling a reading clock control to interrupt the writing operation into said frame buffer memory upon each detection of a dummy flag bit, said means for controlling then reducing said reading clock frequency or said reading clock signal, and said means for controlling returning said reading clock frequency of said reading clock signal to its original value, said reading clock control controlling thereby regenerating the continuous information signals prior to the time division multiplexing, wherein said reading clock controlling means includes a frequency synthesizer, the frequency synthesizer comprising:

means in response to the writing clock signal for generating a reference reading frequency signal;

means for generating an address clock signal the clock frequency of which is 1/N times the frequency of the reference reading frequency signal, N being an integer;

means for storing a predetermined number of samples in a unit sine or cosine wave, each sample being read out in response to each clock of the address clock signal to produce an auxiliary frequency signal; and a quadrant modulator in response to both of the reference reading frequency signal and the auxiliary frequency signal for producing the reading clock signal, the clock frequency of which is given as the difference between the frequencies of the reference reading frequency signal and the auxiliary frequency signal.

* * * * *